US012766931B2

(12) United States Patent
Oh et al.

(10) Patent No.: US 12,766,931 B2
(45) Date of Patent: Oct. 20, 2026

(54) VEHICLE VISOR SYSTEMS WITH MULTIDIRECTIONAL SHADING

(71) Applicant: GM GLOBAL TECHNOLOGY OPERATIONS LLC, Detroit, MI (US)

(72) Inventors: Sejin Oh, Yeonsu-gu (KR); Semyeong Choi, Pyeongtaek-si (KR); Janghyuk Pang, Incheon (KR); Jongwoo Bae, Seoul (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 366 days.

(21) Appl. No.: 18/406,422

(22) Filed: Jan. 8, 2024

(65) Prior Publication Data

US 2025/0222750 A1 Jul. 10, 2025

(51) Int. Cl.
*B60J 3/02* (2006.01)

(52) U.S. Cl.
CPC ........... *B60J 3/0208* (2013.01); *B60J 3/0226* (2013.01)

(58) Field of Classification Search
CPC .............................. B60J 3/0208; B60J 3/0226
See application file for complete search history.

(56) References Cited

U.S. PATENT DOCUMENTS 4,858,982 A * 8/1989 Dykstra ................. B60J 3/0282 296/97.8
5,445,427 A * 8/1995 Vandagriff ............. B60J 3/0208 296/97.8
6,189,947 B1 * 2/2001 Annan ................... B60J 3/0208 296/97.8
6,409,246 B1 * 6/2002 Rennie ................... B60J 3/0208 296/97.8
7,731,265 B1 * 6/2010 Cohen .................... B60J 3/0208 296/97.9
2010/0019527 A1 * 1/2010 Asai ....................... B60J 3/0217 296/97.1
2011/0109117 A1 * 5/2011 Marcus .................. B60J 3/0208 296/97.5
2013/0033060 A1 * 2/2013 Marcus .................. B60J 3/0208 296/97.8
2018/0297453 A1 10/2018 Worden
2018/0339575 A1 * 11/2018 Johananoff ............ B60J 3/0226
2022/0118828 A1 4/2022 Mahan

FOREIGN PATENT DOCUMENTS

DE 202004019203 U1 3/2005

* cited by examiner

*Primary Examiner* — Taras P Bemko
(74) *Attorney, Agent, or Firm* — Ingrassia Fisher & Lorenz, LLP | IFL

(57) ABSTRACT

Visor systems for a vehicle include a visor body coupled with the vehicle by one hinge system. The visor body operates as a first shade. A cover is coupled with the visor body by another hinge system. The cover operates as a second shade. A mirror is disposed on the visor body, and the cover selectively covers the mirror.

20 Claims, 5 Drawing Sheets

VEHICLE VISOR SYSTEMS WITH MULTIDIRECTIONAL SHADING

INTRODUCTION

The present disclosure generally relates to vehicle sun visors to shade light from reaching a passenger and more particularly relates to visor systems that provide multidirectional shading.

A vehicle generally has a windshield, a rear window, and side windows through which light may enter the vehicle's interior. Front seat passengers in particular, are exposed to the light that enters through both the windshield and the side windows. The light may originate from a number of sources which may have various levels of intensities. Some light sources may be of a lower intensity and may not be in need of shading. Others, such as direct sunlight, may have a higher intensity and a way to provide at least partial shading may be desired.

In a number of situations, it may be desirable to shade a passenger's eyes from the light entering the vehicle's interior. Because roadways follow curves and travel routes include turns, the direction from which light sources enter the vehicle may be constantly changing. Accounting for these directional changes may become repeatedly necessary, which may require adjusting a sun visor to provide the desired shading effect. For example, when driving toward the sun, the driver may lower the sun visor over a part of the windshield. When the vehicle turns right, the driver may turn the sun visor away from the windshield to shade a part of the driver's side window. In a trip, this may require a large number of repeated adjustments.

Accordingly, it is desirable to provide vehicle sun visors with capabilities that meet a range of different light sources and driving directions. Preferably, this may be accomplished while minimizing the number of manual adjustments that must be made. Furthermore, other desirable features and characteristics of the present invention will become apparent from the subsequent detailed description and the appended claims, taken in conjunction with the accompanying drawings and the foregoing introduction.

SUMMARY

Systems are provided for shading light entering a vehicle. A visor system includes a visor body coupled with the vehicle by one hinge system. The visor body operates as a first shade. A cover is coupled with the visor body by another hinge system. The cover operates as a second shade. A mirror is disposed on the visor body, and the cover selectively covers the mirror.

In additional embodiments, the one hinge system includes a ball joint that allows the cover to move in multiple axes relative to the visor body.

In additional embodiments, the one hinge system includes a detachable hinge configured to separate the cover from the visor body.

In additional embodiments, the cover includes an extension that expands the cover in length from the visor body.

In additional embodiments, the cover includes a perimeter section defining an opening and includes a door coupled with the perimeter section by a third hinge system.

In additional embodiments, the vehicle includes a front windshield and a side window, wherein the visor body extends over the front windshield while the cover extends over the side window to simultaneously shade both front and side light.

In additional embodiments, the cover includes a perimeter section defining an opening and includes a door coupled with the perimeter section by a third hinge system. The opening registers with the mirror so that the door alternatively covers and uncovers the mirror.

In additional embodiments, a lamp is disposed on the visor body adjacent to the mirror. A switch activates the lamp when the door is opened.

In additional embodiments, the one hinge system includes a ball joint and a detachable hinge, wherein the ball joint is configured to allow the cover to move in multiple axes relative to the visor body when the detachable hinge is detached.

In additional embodiments, a lamp is included on the visor body, wherein the lamp is configured to remain off when the cover is opened for shading purposes.

In a number of additional embodiments, a visor system for a vehicle includes a visor body coupled with the vehicle by one hinge system, the visor body is constructed as a first shade. A cover is coupled with the visor body by another hinge system. The cover is constructed as an additional shade. A mirror is disposed on the visor body. The cover, when closed, selectively covers the mirror. A door is coupled with the cover by a third hinge system. The door operates to uncover the mirror when the cover is closed.

In additional embodiments, the one hinge system includes a ball joint that allow the cover to move in multiple axes relative to the visor body.

In additional embodiments, the one hinge system includes a detachable hinge that separates the cover from the visor body.

In additional embodiments, the cover includes an extension that expands the cover in length from the visor body.

In additional embodiments, the cover includes a perimeter section defining an opening. The door operates to close the opening.

In additional embodiments, the vehicle includes a front windshield and a side window. The visor body extends over the front windshield while the cover extends over the side window to simultaneously shade both front and side light.

In additional embodiments, the cover includes a perimeter section defining an opening. The opening registers with the mirror so that the door alternatively covers and uncovers the mirror.

In additional embodiments, a lamp is disposed on the visor body adjacent to the mirror. A switch activates the lamp when the door is opened.

In additional embodiments, the one hinge system includes a ball joint and a detachable hinge. The ball joint allows the cover to move in multiple axes relative to the visor body when the detachable hinge is detached.

In a number of other embodiments, visor system for a vehicle includes a visor body coupled with the vehicle by a hinge system. The visor body operates as a shade. A cover is coupled with the visor body by another hinge system. The cover operates as another shade. A mirror is included on the visor body. The cover operates, when closed, to selectively cover the mirror. A door is coupled with the cover by an additional hinge system. The door operates to selectively uncover the mirror when the cover is closed. One of the hinge systems includes a detachable hinge and a multi-axis hinge to allow the cover to move in multiple axes relative to the visor body.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description.

Figure 1:
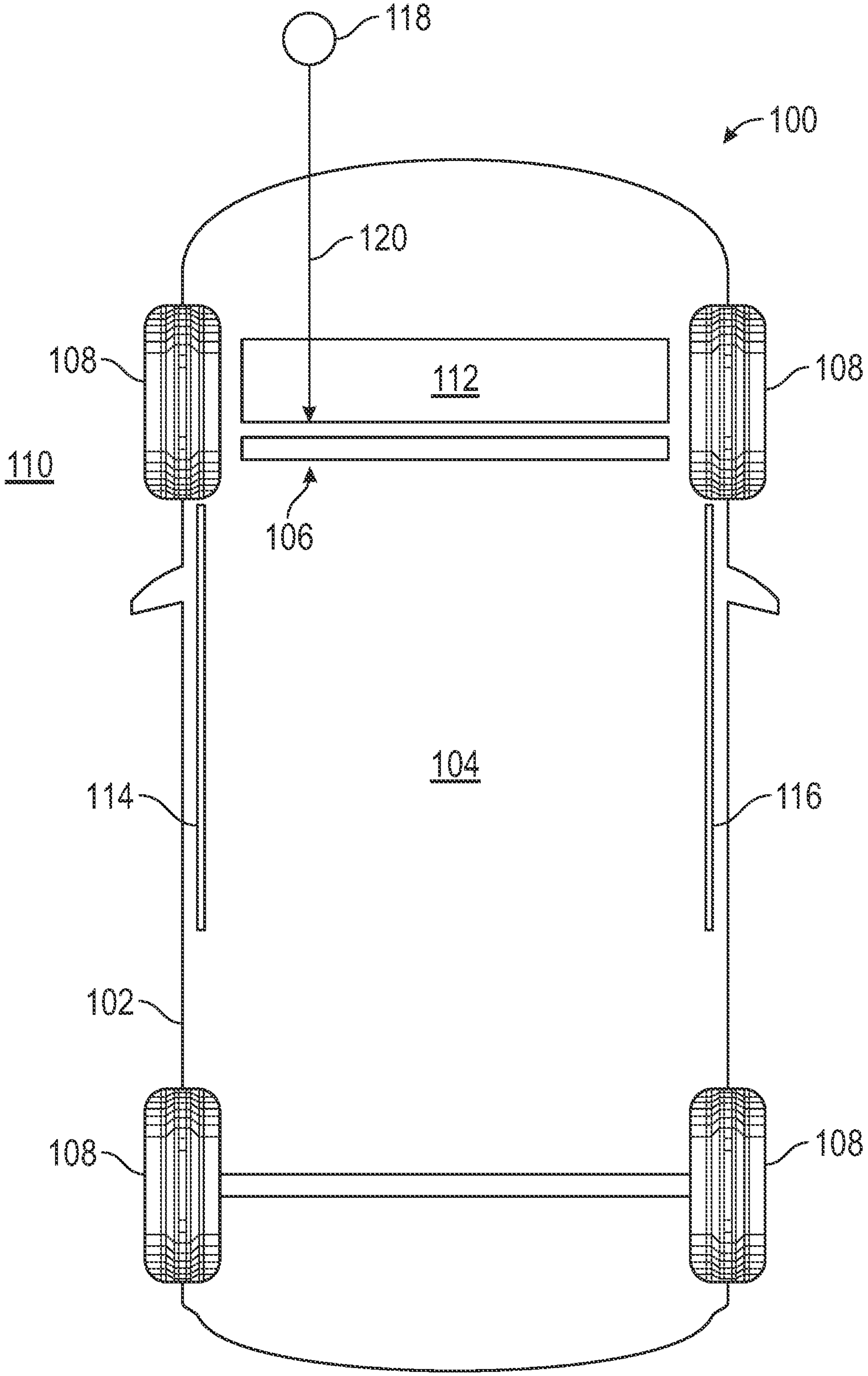
FIG. 1 is a schematic diagram of a vehicle with a visor system, in accordance with various embodiments.

With reference to FIG. 1, illustrated is an example of a vehicle 100 with a body 102 enclosing an interior 104 that has a visor system 106. As depicted in FIG. 1, the vehicle 100 generally includes a structure including the body 102, supported on wheel assemblies 108, such as by a suspension assembly (not shown). The body 102 may be of various types that define a physical shape for desired purposes. The body 102 substantially encloses components of the vehicle 100 and defines exterior surfaces facing an exterior 110, and defines the interior 104. The wheel assemblies 108 are each rotationally coupled near a respective corner of the body 102. In various embodiments, the vehicle 100 may be a front wheel drive vehicle, a rear wheel drive vehicle, or an all-wheel drive vehicle with any number of wheels, however other drive arrangements are contemplated.

Propulsion of the vehicle 100, such as on a roadway, is provided by a propulsion system (not shown). The propulsion system may be any of various types such as electric, internal combustion, hybrid, or others. Torque generated by the propulsion system is transferred to the wheel assemblies 108 to propel the vehicle 100, which may be done under manual and/or autonomous control.

In the current embodiment the body 102 includes a number of openings with glass windows including a windshield 112 and side windows 114, 116. During operation of the vehicle 100, light sources 118 at the exterior 110, such as the sun, may emit light 120 that enters to the interior 104 through the windshield 112 and/or side windows 114, 116. The amount and the direction of the light 120 may change repeatedly during operation of the vehicle 100. The visor system 106 selectively shades the light 120 from directly shining on the passengers, such as on the driver of the vehicle 100.

Figure 2:
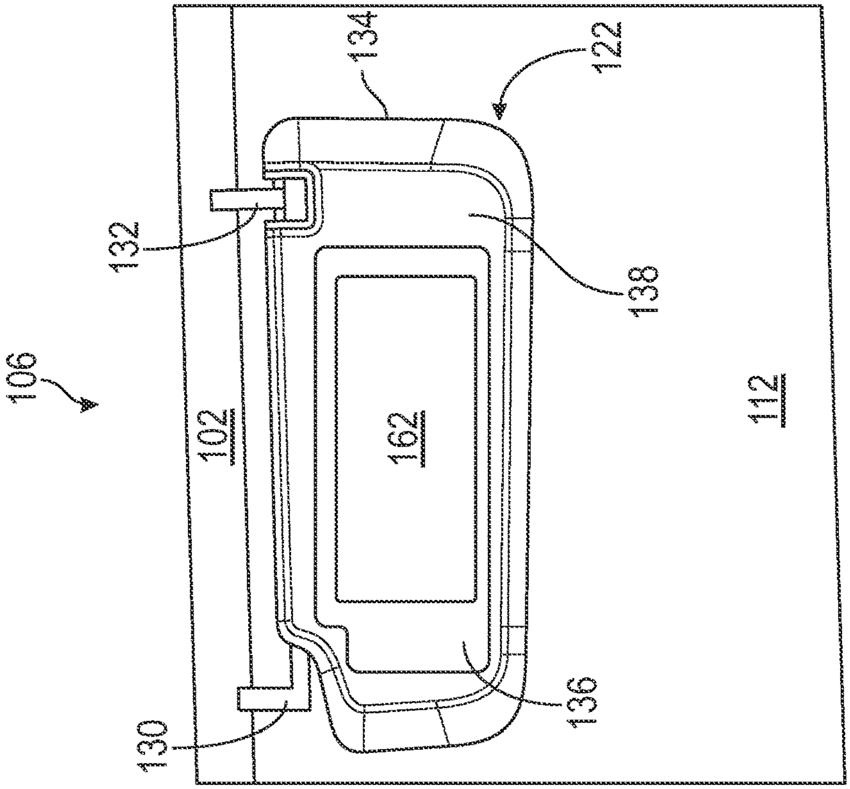
FIG. 2 is a schematic, perspective illustration of the visor system of FIG. 1, in accordance with various embodiments.

Referring additionally to FIG. 2 with continued reference to FIG. 1, the visor system 106 includes a visor assembly 122. In the current embodiment, the visor assembly 122 is intended for the driver's side of the vehicle 100. It will be appreciated that the passenger's side and/or other passenger positions in the vehicle 100 may have assemblies similar to the visor assembly 122. In this embodiment, the visor assembly 122 is coupled with the body 102 at the top of the windshield 112 by hinges 130, 132. The hinges 130, 132 enable a visor body 134 to be placed at various angles relative to the windshield 112. For example, the visor body 134 may be rotated up (raised) to expose more of the windshield 112 and may be rotated down (lowered) to cover more of the windshield 112. A cover 136 is provided on a side 138 of the visor body 134 that faces into the interior 104 when the visor body 134 is lowered as shown. In the current embodiment, the cover 136 is a mirror cover. The visor body 134 may be made from a material such as expanded polypropylene covered by a fabric layer or may be of other substantially rigid construction.

Figure 3:
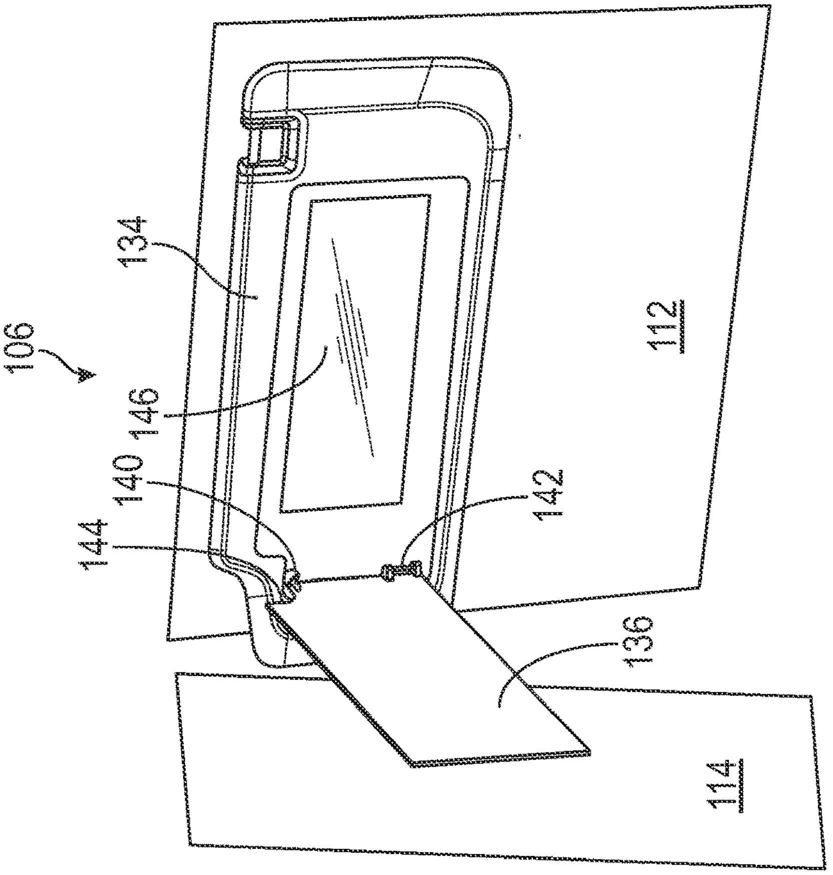
FIG. 3 is a schematic, perspective illustration of the visor system of FIG. 1 with an opened mirror cover, in accordance with various embodiments.

As shown in FIG. 3, the cover 136 (shown opened), is attached with the visor body 134 by a hinge system that includes an upper hinge 140 and a lower hinge 142. The upper hinge 140 and the lower hinge 142 are located at the outboard (relative to the vehicle 100) edge 144 of the cover 136. In FIG. 3, the cover 136 is shown rotated on the upper hinge 140 and the lower hinge 142 to an opened position which exposes a mirror 146 on the visor body 134. In this opened position, the cover 136 is disposed along the side window 114 to shade light entering therethrough. As shown, the visor body 134 shades the light 120 entering through the windshield 112 and the cover 136 simultaneously shades the light 120 entering through the side window 114.

Figure 4:
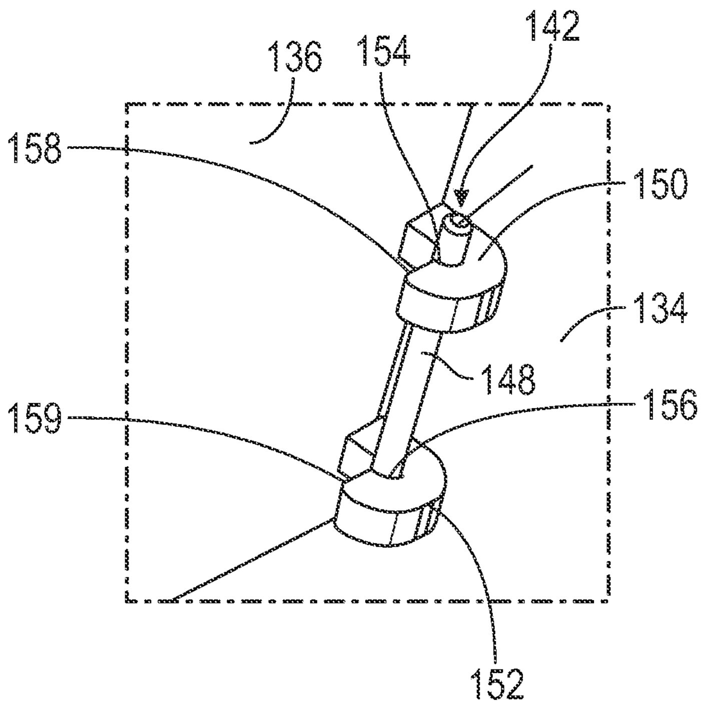
FIG. 4 is a schematic, perspective illustration of a releasable hinge of the visor system of FIG. 1, in accordance with various embodiments.

Referring to FIG. 4, the lower hinge 142 is shown in isolation. In general, the lower hinge 142 is a detachable connection that pivotably holds the cover 136 to the visor body 134. The lower hinge 142 may be selectively detached to allow the cover 136 to move in any direction relative to the visor body 134 in addition to the pivoting allowed when attached. The lower hinge 142 includes a pin 148 that is fixed to the visor body 134 in this embodiment, and a pair of clips 150, 152 that are fixed to the cover 136. The clips 150, 152 have openings 154, 156 that receive the pin 148 with mouths 158, 159 that register with the openings 154, 156 and that allow the clips 150, 152 to releasably clip onto the pin 148. An interference fit is provided so that a force must be applied to move the pin 148 through the mouths 158, 159.

Figure 5:
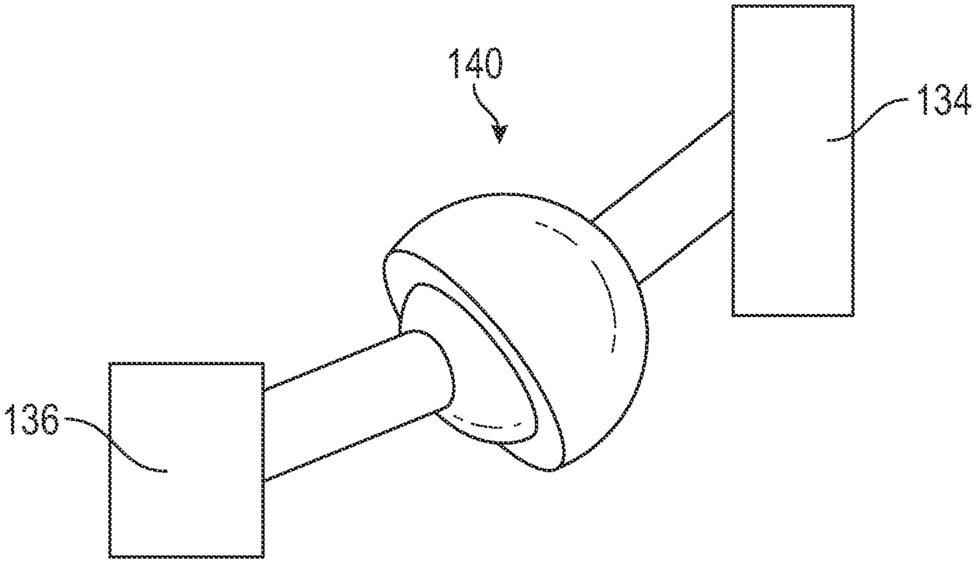
FIG. 5 is a schematic, perspective illustration of a multidirectional hinge of the visor system of FIG. 1, in accordance with various embodiments.

The upper hinge 140 is shown in isolation in FIG. 5. In this embodiment the upper hinge 140 is a ball joint type of connector with a ball and socket that provide multiple degrees of freedom in movement of the cover 136 relative to the visor body 134 (e.g. in x, y and z directions and rotation about 3-axes). For example, when the cover 136 is opened, the lower hinge 142 may be detached and the upper hinge 140 allows the cover 136 to move up and down relative to the visor body 134 and to rotate relative thereto. In other embodiments, another form of joint may be used in the upper hinge 140 to allow multi-directional movement to adjust the cover 136 in multiple directions.

Figure 6:
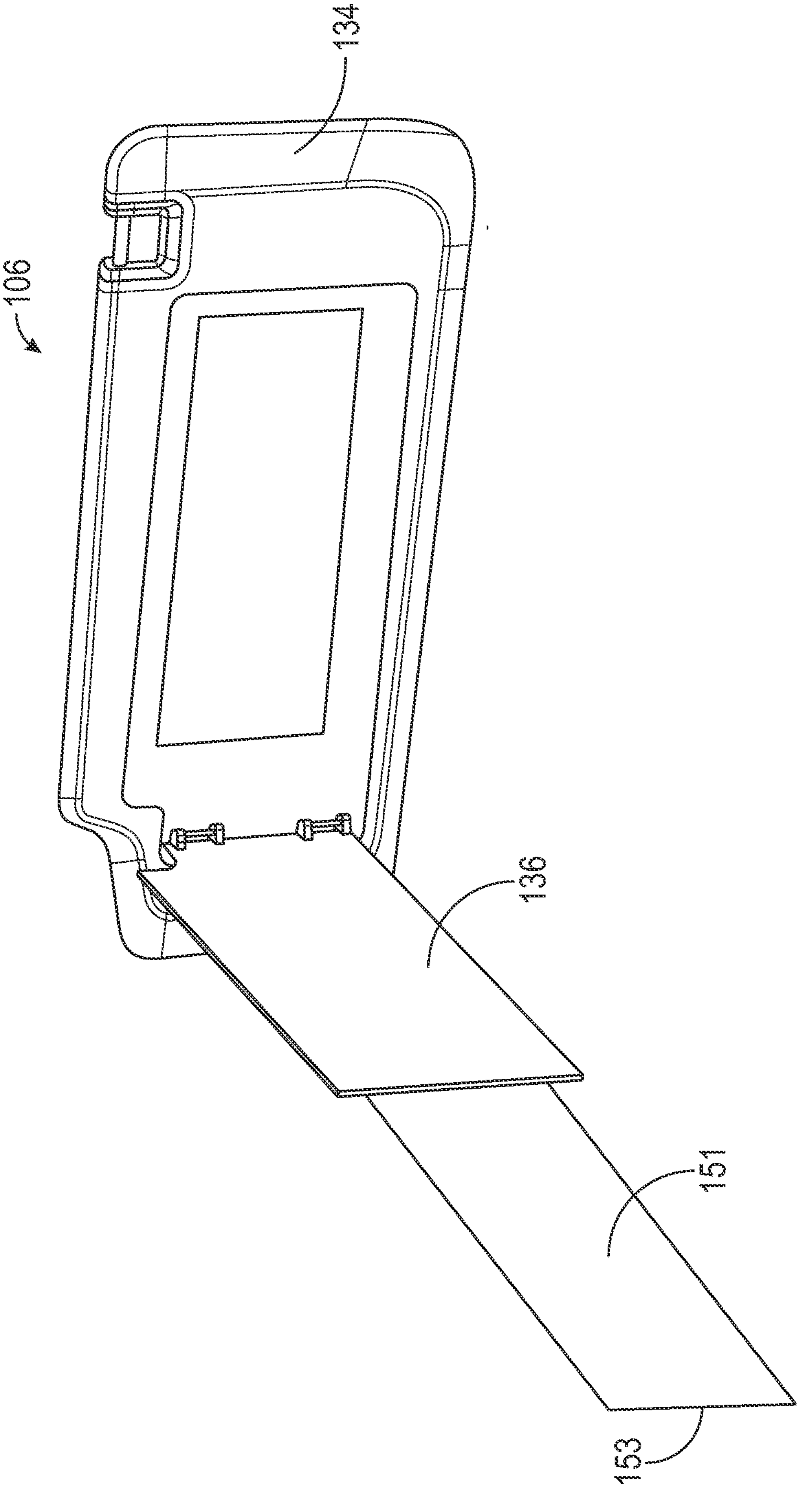
FIG. 6 is a schematic, perspective illustration of the visor system of FIG. 1 with an opened mirror cover and extended sliding shade, in accordance with various embodiments.

Referring to FIG. 6, the cover 136 is shown in an open position with its extension 151 in a deployed state. The extension 151 is included as a part of the cover 136 that is slidably connected to adjust the length the cover 136 extends from the visor body 134 to its terminal end 153. The extension 151 may be slidably moved to make the cover 136 longer to provide additional shading at the rear of the side window 114. The extension 151 may be contained within grooves, in a pocket, or by other features of the cover 136.

Figure 7:
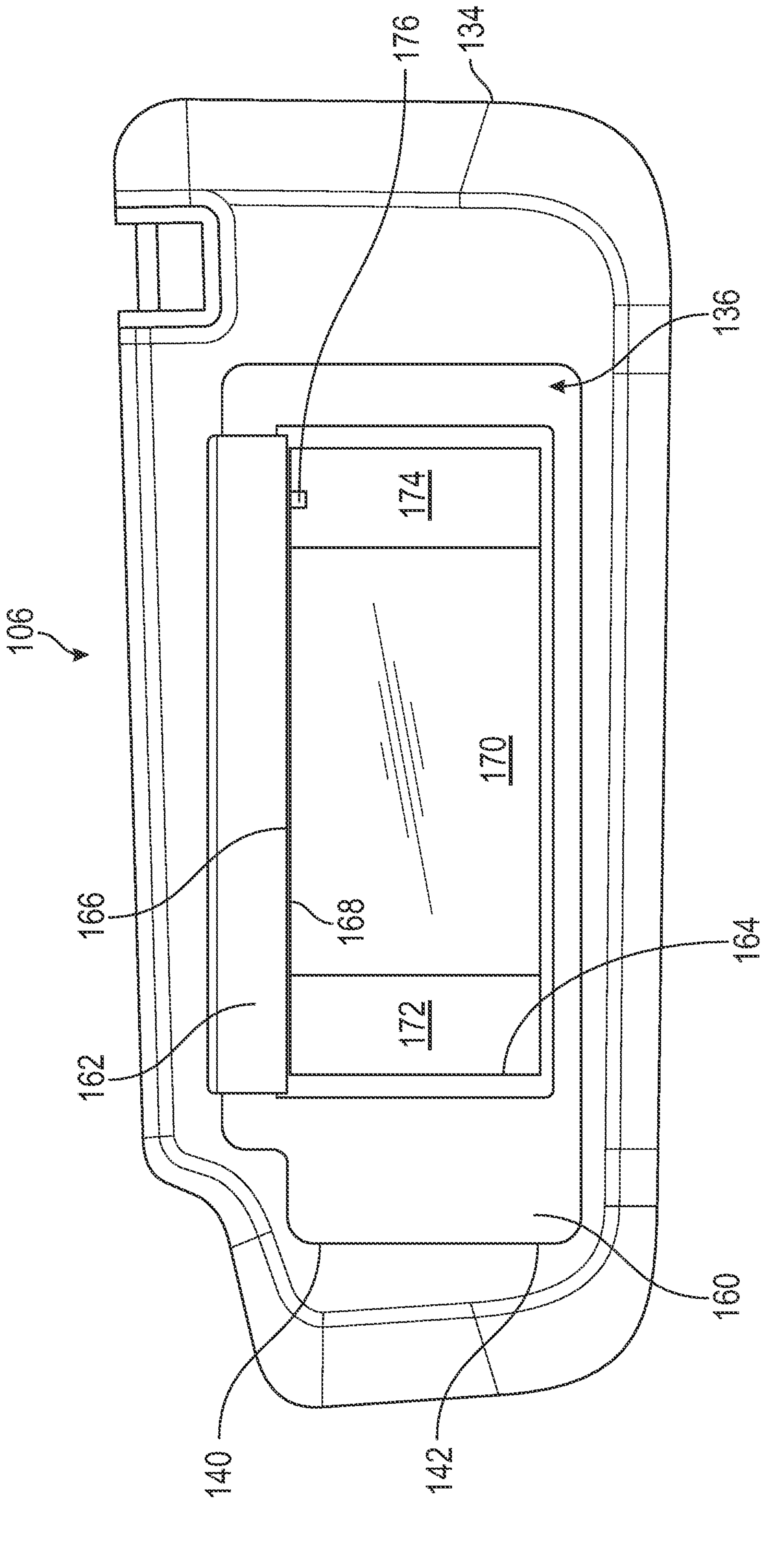
FIG. 7 is a schematic, perspective illustration of the visor system of FIG. 1 with an opened mirror cover port, in accordance with various embodiments.

As shown in FIG. 7, the cover 136 includes a perimeter section 160 and a door 162. The door 162 is shown in an open position in FIG. 7 (the door 162 is shown closed in FIG. 2). The perimeter section 160 of the cover 136 is connected with the visor body 134 by the upper hinge 140 and the lower hinge 142. The perimeter section 160 defines an opening 164 that the door 162 operates to alternatively open and close. The door 162, along its edge 166, is connected with the perimeter section 160 by a hinge 168. A mirror 170 is positioned on the visor body 134 (like mirror designated 146 of FIG. 3) and is accessible when the door 162 is open. In this regard, the opening 164 registers with the mirror 170 when the door 162 is opened. Lamps 172, 174 are disposed alongside the mirror 170 on the visor body 134. A switch 176 is operated by the door 162 so that when the door 162 is opened relative to the perimeter section 160, the switch 176 activates the lamps 172, 174. In this way, when the cover 136 is opened relative the visor body 134 by rotating on the upper hinge 140 and the lower hinge 142 with the door 162 closed, the lamps 172, 174 are not turned on. Accordingly, the lamps 172, 174 are not turned on when the cover 136 is deployed for shading purposes and are turned on when the door 162 is opened.

Accordingly, visor systems with multidirectional shading capabilities are provided. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A visor system for a vehicle that has a windshield and a side window, comprising:

a visor body coupled with the vehicle by a first hinge system, the visor body configured as a first shade by pivoting the visor body toward the windshield;

a cover coupled with the visor body by a second hinge system, the cover configured as a second shade by pivoting the cover toward the side window, wherein the cover includes a perimeter section and a door, wherein the second hinge system couples a side edge of the perimeter section of the cover to the visor body so that the cover is pivotable relative to the visor body and about the second hinge system;

a mirror and a light on the visor body, the cover configured to selectively cover the mirror;

a third hinge system coupling a lateral edge of the door to the perimeter section; and a switch disposed between the perimeter section and the door, wherein the switch effects illumination of the light when the door is opened by pivoting about the third hinge system, wherein the switch does not effect illumination of the light when the cover, including the perimeter section and the door, is pivoted about the second hinge system.

2. The visor system of claim 1, wherein the second hinge system includes a ball joint configured to allow the cover to move in multiple axis relative to the visor body.

3. The visor system of claim 1, wherein the second hinge system includes a detachable hinge configured to separate the cover from the visor body.

4. The visor system of claim 1, wherein the second hinge system includes a first hinge that comprises a ball and socket and a second hinge that is detachable with a pin and clips.

5. The visor system of claim 1, wherein the mirror is exposed when the door is opened about the third hinge system and the perimeter section remains closed against the visor body.

6. The visor system of claim 1, wherein the vehicle includes a front windshield and a side window, wherein the visor body extends over the front windshield while the cover extends over the side window to simultaneously shade both front and side light.

7. The visor system of claim 1, wherein the door is configured to alternatively cover and uncover the mirror.

8. The visor system of claim 1, comprising a pin on the visor body, wherein the second hinge system includes a pair of clips that are fixed to the cover and that include openings that receive the pin with mouths that register with the openings and that allow the clips to releasably clip onto the pin with an interference fit.

9. The visor system of claim 1, wherein the second hinge system includes a ball joint and a detachable hinge, wherein the ball joint is configured to allow the cover to move in multiple axes relative to the visor body when the detachable hinge is detached.

10. The visor system of claim 1, wherein the visor body is configured to shade light entering through the windshield while the cover simultaneously shades the light entering through the side window.

11. A visor system for a vehicle that has a windshield and a side window, comprising:

a visor body coupled with the vehicle by a first hinge system, the visor body configured as a first shade by pivoting the visor body toward the windshield;

a cover coupled with the visor body by a second hinge system, the cover configured as a second shade by pivoting the cover toward the side window, wherein the cover includes a perimeter section and a door, wherein the second hinge system couples a side edge of the perimeter section of the cover to the visor body so that the cover is pivotable relative to the visor body and about the second hinge system;

a mirror and a light on the visor body, the cover configured, when closed, to selectively cover the mirror and the light;

a third hinge system coupling a lateral edge of the door to the perimeter section; and a switch disposed between the perimeter section and the door, wherein the switch effects illumination of the light when the door is opened by pivoting about the third hinge system, wherein the switch does not effect illumination of the light when the cover, including the perimeter section and the door, is pivoted about the second hinge system so that when the cover is opened relative the visor body by rotating on the second hinge system with the door closed against the perimeter section, the light is not turned on when the cover is deployed for shading the side window.

12. The visor system of claim 11, wherein the second hinge system includes a ball joint configured to allow the cover to move in multiple axis relative to the visor body.

13. The visor system of claim 11, wherein the second hinge system includes a detachable hinge configured to separate the cover from the visor body.

14. The visor system of claim 11, wherein the second hinge system includes a first hinge that comprises a ball and socket and a second hinge that is detachable with a pin and clips.

15. The visor system of claim 11, wherein the mirror is exposed when the door is opened about the third hinge system and the perimeter section remains closed against the visor body.

16. The visor system of claim 11, wherein the vehicle includes a front windshield and a side window, wherein the visor body extends over the front windshield while the cover extends over the side window to simultaneously shade both front and side light.

17. The visor system of claim 11, wherein the door is configured to alternatively cover and uncover the mirror.

18. The visor system of claim 11, comprising a pin on the visor body, wherein the second hinge system includes a pair of clips that are fixed to the cover and that include openings that receive the pin with mouths that register with the openings and that allow the clips to releasably clip onto the pin with an interference fit.

19. The visor system of claim 11, wherein the second hinge system includes a ball joint and a detachable hinge, wherein the ball joint is configured to allow the cover to move in multiple axes relative to the visor body when the detachable hinge is detached.

20. A visor system for a vehicle that has a windshield and a side window, comprising:

a visor body coupled with the vehicle by a first hinge system, the visor body configured as a first shade by pivoting the visor body toward the windshield;

a cover coupled with the visor body by a second hinge system, the cover configured as a second shade by pivoting the cover toward the side window, wherein the cover includes a perimeter section and a door, wherein the second hinge system couples a side edge of the perimeter section of the cover to the visor body so that the cover is pivotable relative to the visor body and about the second hinge system;

a mirror and a light on the visor body, the cover configured, when closed, to selectively cover the mirror;

a third hinge system coupling a lateral edge of the door to the perimeter section; and a switch disposed between the perimeter section and the door, wherein the switch effects illumination of the light when the door is opened by pivoting about the third hinge system, wherein the switch does not effect illumination of the light when the cover, including the perimeter section and the door, is pivoted about the second hinge system, wherein the second hinge system includes a detachable hinge and a multi-axis hinge to allow the cover to move in multiple axes relative to the visor body.

* * * * *